United States Patent [19]

Rakoczi et al.

[11] 3,856,778

[45] Dec. 24, 1974

[54] PHARMACEUTICALLY ACTIVE NEW GUANIDINO-ALKYLCYCLO-IMINES

[76] Inventors: Jozsef Rakoczi, 17 Felvinczi uta,, Budapest II; Ivan Beck, 27, Nepkoztarsasag ut, Budapest VI, both of Hungary; Endre Komlos, deceased, late of 1 Kando ku, Budapest II, Hungary by Anna Komlos nee Kiss, administratrix; Lujza Petocz, 2 Rakoczi ter, Budapest VIII; Katalin Grasser, 30 Ferenc Korut, Budapest IX, both of Hungary

[22] Filed: July 18, 1973

[21] Appl. No.: 380,175

Related U.S. Application Data

[63] Continuation of Ser. No. 34,901, May 5, 1970, abandoned, which is a continuation-in-part of Ser. No. 691,131, Dec. 18, 1967, abandoned.

[30] Foreign Application Priority Data

Dec. 30, 1966  Hungary.............................. OE 132

[52] U.S. Cl. ............................ 260/239 B, 424/244
[51] Int. Cl............................................. C07d 41/00
[58] Field of Search ...... 260/239 B, 293.87, 326.86

[56] References Cited

FOREIGN PATENTS OR APPLICATIONS 64,459   11/1968   Germany......................... 260/239 B

OTHER PUBLICATIONS

Short et al., J. Med. Chem., Vol. 6, pages 275–283 (1963). RS1J6.

*Primary Examiner*—Alton D. Rollins
*Attorney, Agent, or Firm*—Blum Moscovitz Friedman & Kaplan

[57] ABSTRACT

Guanidino-alkyl-cycloimines having the following formula I:

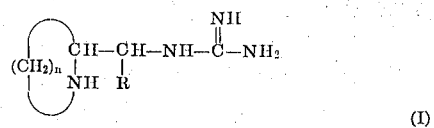

(I)

and salts thereof, wherein R stands for hydrogen or methyl and n stands for an integer 6 or 7. These compounds are blood-pressure reducing agents of great therapeutical efficacy without undesirable side effects.

1 Claim, No Drawings

PHARMACEUTICALLY ACTIVE NEW GUANIDINO-ALKYLCYCLO-IMINES

This is a continuation of application Ser. No. 34,901, filed May 5, 1970, and now abandoned which is a continuation-in-part of now abandoned application Ser. No. 691,131, filed Dec. 18, 1967.

This invention relates to new guanidino-alkyl-cycloimines, a process for the preparation thereof and pharmaceutical compositions containing same.

In accordance with the present invention there are provided new α-guanidino-alkyl-cycloimines of the formula I

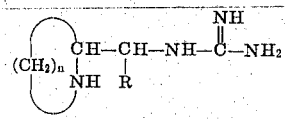

and acid addition salts thereof, wherein R stands for hydrogen or methyl and n is an integer 6 or 7.

The salts of the compounds of the formula I are formed with pharmaceutically acceptable inorganic or organic acids.

In accordance with the present invention there is provided also a process for the preparation of the new compounds of the general formula I, which comprises reacting an α-aminomethyl- or methyl substituted α-aminomethyl-cycloimine of the formula II

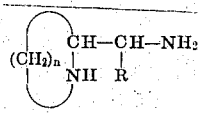

wherein R and n have the same meaning as stated above, in a way known per se with a compound of the general formula III

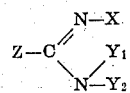

wherein

Z stands for a lower alkoxy, alkylmercapto, amino or nitrosamino group,

X stands for hydrogen or together with Z it stands for a third valence bond between the nitrogen and carbon atom, $Y_1$ and $Y_2$ each stand for hydrogen.

The compounds of the general formula II are also new compounds. They may be prepared by reacting oenantholactim-O-methyl-ether with nitromethane and reducing the obtained 2-nitro-methyl-monoazacyclooctane into 2-aminomethyl-heptamethyleneimine in a known way, e.g. by catalytic hydrogenation, nascent hydrogen developed by sodium or a complex metalhydride.

The oenantholactim-O-methyl-ether is a known compound (USP 2 356 622). The 2-nitromethyl-monoazacyclooctane obtained in the first reaction step is new compound, which may be prepared by the analogous process described in German patent No. 863 056. The nitro-group is reduced into an amino-group in a way known per se.

As suitable representatives of the compounds of the formula III may be mentioned S-alkyl-isothiourea, O-alkyl-isothiourea, nitrosoguanidine, cyanamide, 1-guanyl-3,5-dimethyl-pyrazole.

The reaction is carried out in a polar solvent or in a mixture thereof, preferably in water.

The obtained new compounds of the formula I may be converted, if desired, into pharmaceutically acceptable acid addition salts by reacting them with a non-toxic inorganic or organic acid.

In according with the present invention there are provided pharmaceutical compositions comprising at least one compound of the formula I or a pharmaceutical acceptable acid addition salt thereof alone or mixed with one or more other pharmaceutically active agents as active ingredients and pharmaceutically acceptable carriers and diluents.

The new compounds according to the invention — above all the α-guanidinomethyl-mono-azacyclooctane and the acid addition salts thereof — decrease the blood pressure very effectively.

To prove the surprising effectiveness of the compounds according to the invention, the adjacent homologs thereof (J.H. Short et al. J. Med. Chem. Vol. 6. p. 275–283 (1963)) have been compared with the efficacy of the best known similar compound, guanethidine, and then a comparison has been made between the effectiveness of guanethidine and the compounds according to the invention.

The drugs were administered orally to unanesthetized cats, and the degree and the duration of the prolapse of the nictitating membrane was measured. The results are listed in Table 1.

TABLE 1

| Compound | Dose mg/kg | Duration hrs | Measured values |
|---|---|---|---|
| 2-(2-Piperidyl-* | 15 | 0 | — |
| -ethyl)-guanidine | 30 | 46 | — |
| 1-Methyl-2-piperi-* | 15 | 8 | — |
| dylmethyl-guanidine | 30 | 32 | — |
| Guanethidine ** | 20 | 50 | |
| | 30 | <50, about 100 | 3–9 mm/at 50. hour/. |

\* Short et al. J. Med. Chem. Vol. 6. p. 282 (1963)
\*\* According to our measurements. (The applied method is described by Boura, A. L., and Green, A. F., Brit. J. Pharm. Chemother. 20 36. (1963)) Unlike guanethidine, α-guanidinomethyl-mono-azacyclooctane has brought about maximal relaxation in the dose of 15 mg per kg.

The test to investigate the antihypertensive activity of the compounds according to the invention and to make a comparison between those and the known drug guanethidine has been carried out as follows:

Renal hypertension was provoked on rats by surgical action. The animals were treated with α-guanidinomethyl-mono-aza-cyclooctane (A) and with guanethidine (B) respectively, and the alteration provoked in blood pressure was examined. The results are summarized in the following Table 2.

Table 2

| Compound | Daily Dose mg/kg | Method of Administration | Blood Pressure Before Treatment, Hgmm | Hours after Administration | Altered Value of Blood Pressure Hgmm |
|---|---|---|---|---|---|
| A | 3×10 | s.c. | 174 | 4 | 142 |
| B | 3×10 | s.c. | 173 | 4 | 162 |
| A | 3×10 | s.c. | 174 | 48 | 145 |
| B | 3×10 | s.c. | 173 | 48 | 161 |
| A | 25 | p.o. | 176 | 24 | 146 |
| B | 25 | p.o. | 172 | 24 | 171 |

Renal hypertension was provoked on dogs by surgical action. The animals were treated per os with 10 mg/kg daily doses of α-guanidinomethyl-mono-azacyclooctane during from 3 to 5 days. 24 hours after the administration the blood pressure of the animals decreased in average with 25 Hgmm. The initial value of the blood pressure returned only 5 days after ending the treatment.

All the experiments mentioned above were carried out on awake animals.

The toxicity values of α-guanidinomethyl-mono-azacyclooctane (A) and of guanethidine (B) were compared. The tests were carried out on mice, and the results are listed in the following Table 3.

Table 3

| Compound | Method of administration | $LD_{50}$ mg/kg |
| --- | --- | --- |
| A | s.c. | 700 |
| B | s.c. | 224 |
| A | p.o. | 2450 |
| B | p.o. | 845 |
| A | i.v. | 165 |
| B | i.v. | 34 |

The compounds according to the invention and guanethidine have been studied for chronic toxicity and compared in rats on oral doses for 90 days. The animals were given 75 or 25 mg per kg daily of guanethidine, 150 or 50 mg. per kg. daily of α-guanidinomethyl-mono-azacyclooctane. The weight-gain exceeded normal values. Haematological investigations revealed very slight dose-related increase of the erythrocyte count upon the use of both above-mentioned test substances. No essential difference could be detected in this respect between the two drugs. No change of the leukocyte count or the differential blood count occurred for which the test substances might have been held responsible.

On the evidence of our fluorescence microscopic, histochemical and electron microscopic studies, guanethidine and α-guanidinomethyl-mono-azacyclooctane differ in mode of action. Applied in adaquate doses, guanethidine induces catecholamine depletion while α-guanidinomethyl-mono-azacyclooctane exerts such an effect only in a slight measure (as a rare exception) or not at all. Thus the pharmacological effect of the compounds to the invention, if any, does not rest on catecholamine depletion, but on some other hitherto unknown mechanism.

The following non limitative examples illustrate the production of the new compounds of the formula I.

EXAMPLE 1

In a 250 ml round bottomed flask, provided with a stirrer and a reflux condenser, 71.20 g (0.5 mole) of α-aminomethyl-heptamethylenimine ($n_D^{20} = 1.4870$, b.p. 96°–102°C/10 torr, sulfate m.p. 262°–264°), 100 ml distilled water and 104.35 g (0.75 mole) of S-methyl-isothiourea sulfate are transferred. The mixture is heated to boiling within 30 minutes under stirring and is then refluxed for 4 hours. The methylmercaptan, leaving at the top of the reflux condenser, is oxidized with NaOCl.

The obtained homogenous reaction mixture is allowed to cool and is held at room temperature (20°C) for 24 hours. Finally the mixture is heated to 5°–6°C, the precipitated white crystals are filtered, washed on the filter with a slight amount of acetone and dried. The crude product weighs 78.4 g.

From the mother liquor 11.4 g of the product can be obtained after further standing. The total weight of the product is 89.4 g; yield 59.6 %; m.p. 235°–237°C.

The product is recrystallized by dissolving it in an equal amount of hot water and cooling. Weight of the recrystallized product is 78.9 g; the yield is 52.6 % of the theoretical amount; m.p. 239°–241°C.

The white crystalline product contains 1 mole crystal water: Analysis data for $C_9H_{24}N_4O_5S$ (300.37)

| | | | | | |
| --- | --- | --- | --- | --- | --- |
| calc.: | C 36.00 | H 8.05 | N 18.68 | S 10.67 | O 26.61 % |
| found: | C 36.12 | H 8.20 | N 18.61 | S 10.24 | O 27.05 % |

Spectroscopical data (U.V. and I.R.) prove that the product is 1-aza-cyclooctyl-2-methyl-guanidine sulfate $H_2O$.

EXAMPLE 2

28.45 g (0.2 mole) of α-aminomethyl-heptamethylenimine and 17.2 g (0.2 mole) of nitrosoguanidine are dissolved in 100 ml of distilled water. The solution is allowed to stand for 1 day, then it is stirred on water bath at 75°C for 8 hours. The cooled solution is neutralized with diluted sulfuric acid and after decolouring and filtering the filtrate is concentrated to 50 ml by vacuum distillation. 28.2 g white product is crystallized from the solution and it is recrystallized as shown in Example 1. 24.5 g of the pure product is obtained; the yield is the 41.0 % of the theoretical amount; m.p. 239°–241°C.

Spectroscopical data (U.V. and I.R.) prove that the product is 1-aza-cyclooctyl-2-methyl-guanidine sulfate $H_2O$.

EXAMPLE 3

28.5 g (0,20 mole) of α-aminomethyl-heptamethylenimine and 9.24 g (0,22 mole) of cyanamide are dissolved in 40 ml water while stirring and heating. Some drops of acetic acid are added to the solution, then the mixture is boiled for 3 hours on a steam bath, while an equivalent amount of sulfuric acid is added dropwise to it. The solution — still when it is hot — is decolourised and filtered. Then it is allowed to stand at room temperature for 24 hours. Before filtering the mixture is cooled to 5°–6°C, 35.2 g of the white crude product can be filtered off. After recrystallization 31.0 g of the pure product can be obtained. The yield is the 51.6 % of the theoretical amount; m.p. 237°–240°C.

The spectroscopic data prove that the product is 1-aza-cyclooctyl-2-methyl-guanidinesulfate $H_2O$, having the formula $C_9H_{24}N_4O_5S$.

EXAMPLE 4

15.63 g (0,1 mole) of 1-(2-octaazocinyl-ethylamine (b.p. 101°–104°C 10 torr, m.p. of the sulfate: 270°–274°C), 20 ml of distilled water and 21 g (0.15 mole) of S-methyl-isothiourea sulfate are transferred into a round bottomed flask provided with stirrer and reflux condenser. The reaction mixture is boiled for 3 hours, then after cooling it is allowed to stand at 20°C for 24 hours, finally before filtering it is cooled to 5°C.

The precipitated crystals are filtered and the product is recrystallized by dissolving in 2.5 volumes of 40 % hot, aqueous ethanol 15.03 g of 1-aza-cyclooctyl-2-(1'-methyl)-methylguanidine sulfate is obtained; the yield is 50.8 % of the theoretical amount; m.p. 248°–250°C; Analysis data for $C_{10}H_{24}N_4O_4S_2$ (296.27)

| calc.: | C 40.57 | N 18.95 | H 8.14 | S 10.84 | O 21.36 % |
| --- | --- | --- | --- | --- | --- |
| found: | C 40.90 | N 18.34 | H 8.35 | S 10.42 | O 21.00 % |

EXAMPLE 5

25.65 g (0.2 mole) of α-aminomethyl-hexamethylamine (b.p.: 78°–84°C/10 torr, $n_D^{20}$ = 1,4865, m.p. of the sulfate salt: (275°–278°C) are dissolved in a mixture of 15 ml of distilled water and 15 ml of ethanol, then 41.8 g (0.3 mole) of S-methyl-isothiourea sulfate is added. The mixture is refluxed for 40 hours within stirring. After cooling to room temperature the mixture is allowed to stand for 24 hours, finally it is cooled to 5°–6°C. The precipitated crystals are filtered, washed on the filter with a slight amount of acetone, then it is recrystallized from equal amount of hot water. 29.40 g of 1-aza-cycloheptyl-2-methyl-guanidine sulfate are obtained. The yield is the 54.85 % of the theoretical amount, m.p. 246°–249°C. Analysis data for $C_8H_{20}N_4O_4S$

| calc.: | C 35.70 | N 20.90 | H 7.05 | S 11.94 | O 23.80 % |
| --- | --- | --- | --- | --- | --- |
| found: | C 35.24 | N 20.72 | H 7.44 | S 11.27 | O 24.10 % |

What we claim is:

1. A compound of the formula

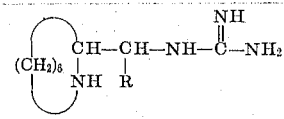

or pharmaceutically acceptable acid addition salts thereof, wherein R stands for hydrogen or methyl.

* * * * *